United States Patent
Mineya et al.

(10) Patent No.: US 12,456,732 B2
(45) Date of Patent: Oct. 28, 2025

(54) NEGATIVE ELECTRODE MATERIAL AND BATTERY

(71) Applicant: Panasonic Intellectual Property Management Co., Ltd., Osaka (JP)

(72) Inventors: Kunihiko Mineya, Osaka (JP); Kenta Nagamine, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 503 days.

(21) Appl. No.: 18/049,192

(22) Filed: Oct. 24, 2022

(65) Prior Publication Data
US 2023/0084047 A1 Mar. 16, 2023

Related U.S. Application Data

(63) Continuation of application No. PCT/JP2021/005350, filed on Feb. 12, 2021.

(30) Foreign Application Priority Data

Apr. 28, 2020 (JP) ................. 2020-079491

(51) Int. Cl.
 *H01M 4/62* (2006.01)
 *H01M 4/02* (2006.01)
 *H01M 4/133* (2010.01)
 *H01M 4/1393* (2010.01)
 *H01M 4/587* (2010.01)
 *H01M 10/0562* (2010.01)

(52) U.S. Cl.
 CPC ............. *H01M 4/62* (2013.01); *H01M 4/133* (2013.01); *H01M 4/1393* (2013.01); *H01M 4/587* (2013.01); *H01M 10/0562* (2013.01); *H01M 2004/021* (2013.01); *H01M 2004/027* (2013.01); *H01M 2300/008* (2013.01)

(58) Field of Classification Search
 CPC ...... H01M 4/62; H01M 4/133; H01M 4/1393; H01M 4/36
 See application file for complete search history.

(56) References Cited

U.S. PATENT DOCUMENTS

2006/0147799 A1 7/2006 Hayashi et al.
2008/0032194 A1 2/2008 Nakai et al.
(Continued)

FOREIGN PATENT DOCUMENTS

CN 109565032 A 4/2019
JP 2008-027778 A 2/2008
(Continued)

OTHER PUBLICATIONS

Extended European Search Report dated Sep. 19, 2023 issued in the corresponding European Patent Application No. 21796715.7.
(Continued)

*Primary Examiner* — Sarah A. Slifka
(74) *Attorney, Agent, or Firm* — Rimon P.C.

(57) ABSTRACT

A negative electrode material of the present disclosure includes a negative electrode active material, a solid electrolyte, and a coating material coating the negative electrode active material. The coating material is represented by the following composition formula (1), where a, b, and c are each a positive real number, A is at least one selected from the group consisting of P and S, and X is F and O.

$$\text{Li}_a A_b X_c \tag{1}$$

12 Claims, 1 Drawing Sheet

(56) References Cited

U.S. PATENT DOCUMENTS

| | | |
|---|---|---|
| 2019/0214630 A1 | 7/2019 | Kawada et al. |
| 2020/0058932 A1 | 2/2020 | Maeda |
| 2020/0161632 A1 | 5/2020 | Yamashita et al. |
| 2020/0343554 A1 | 10/2020 | Oshima et al. |
| 2021/0230002 A1 | 7/2021 | Maeda |

FOREIGN PATENT DOCUMENTS

| | | |
|---|---|---|
| JP | 4729716 B2 | 4/2011 |
| JP | 2015-002054 A | 1/2015 |
| JP | 5984014 B2 | 9/2016 |
| WO | 2015/001957 A1 | 1/2015 |
| WO | 2018/083937 A1 | 5/2018 |
| WO | 2018/221263 A1 | 12/2018 |
| WO | 2019/146308 A1 | 8/2019 |
| WO | 2019/235469 A1 | 12/2019 |

OTHER PUBLICATIONS

International Search Report issued on May 11, 2021 in International Patent Application No. PCT/JP2021/005350, with English translation.

Chinese Search Report dated Apr. 2, 2025 issued in the corresponding Chinese Patent Application No. 202180028645.4, with English translation.

NEGATIVE ELECTRODE MATERIAL AND BATTERY

This application is a continuation of PCT/JP2021/005350 filed on Feb. 12, 2021, which claims foreign priority of Japanese Patent Application No. 2020-079491 filed on Apr. 28, 2020, the entire contents of both of which are incorporated herein by reference.

BACKGROUND OF THE INVENTION

1. Field of the Invention

The present disclosure relates to a negative electrode material and a battery.

2. Description of Related Art

Japanese Patent No. 4729716 discloses a powdery negative electrode active material that is amorphous coated graphite made up of graphite particles whose surfaces are at least partially coated with amorphous carbon.

SUMMARY OF THE INVENTION

Batteries using a solid electrolyte are inferior to batteries using an electrolyte solution in terms of charge rate characteristics. On this account, there is demand for improvement in charge rate characteristics of solid-state batteries.

The present disclosure provides a negative electrode material including:
- a negative electrode active material;
- a solid electrolyte; and
- a coating material coating the negative electrode active material, wherein the coating material is represented by the following composition formula (1):

$$Li_a A_b X_c \quad (1)$$

where a, b, and c are each a positive real number,
A is at least one selected from the group consisting of P and S, and
X is F and O.

The present disclosure can improve the charge rate characteristics of a solid-state battery.

Figure 1:
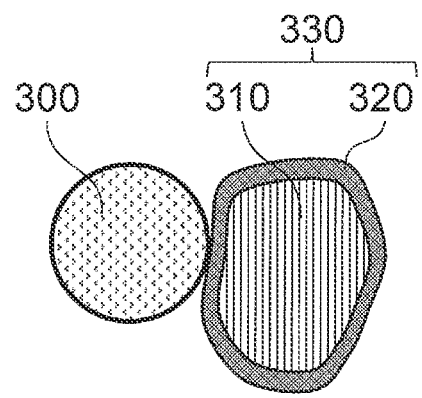
FIG. 1 is a cross-sectional view schematically showing the structure of a negative electrode material 3000 according to Embodiment 1.

DETAILED DESCRIPTION (Findings on which the Present Disclosure is Based)

The development of solid-state batteries using a solid electrolyte has been moving forward in recent years. In solid-state batteries, the area of the interface between a negative electrode active material and an electrolyte tends to be small as compared with lithium-ion batteries using an electrolyte solution. A reduction in the area of the interface causes deterioration of charge rate characteristics, which are input rate characteristics when lithium ions are intercalated into the negative electrode active material. This is the reason why solid-state batteries tend to have charge rate characteristics inferior to those of lithium-ion batteries using an electrolyte solution. In order to promote widespread use of solid-state batteries, there is demand for improvement in charge rate characteristics, which leads to a shortened charging time.

In the field of lithium-ion liquid batteries using an electrolyte solution, studies have been made on various compounds that dissolve in organic electrolyte solutions. A coating is formed on the surface of a negative electrode by utilizing, for example, a phenomenon in which such a compound causes a reduction reaction on the surface of the negative electrode. Attempts have been made to modify the characteristics of a negative electrode active material by forming such a coating. However, since solid-state batteries use a solid electrolyte, conventional methods are not readily applicable. That is to say, in the field of solid-state batteries, there have been few attempts to modify the characteristics of a negative electrode active material by coating the negative electrode active material with a coating material.

The following is an example of the method for improving the charge rate characteristics of a battery. Specifically, the mass of a negative electrode active material is reduced to reduce the capacity per unit area. This can reduce the amount of current per unit area, whereby the charge rate characteristics with a time rate current can be improved. However, reducing the mass of the negative electrode active material also gives rise to the necessity of reducing the mass of a positive electrode active material. This results in a reduced capacity of the battery. Since the volumes of members that do not contribute to the capacity (such as current collectors and insulating layers) remain the same, the proportion of materials that contribute to the capacity is relatively reduced. Accordingly, the energy density of the battery per unit volume or per unit mass is also reduced.

The present disclosure was made in light of the foregoing and provides a negative electrode material that can improve the charge rate characteristics of a battery.

Summary of One Aspect According to the Present Disclosure

A negative electrode material according to a first aspect of the present disclosure is a negative electrode material including:
- a negative electrode active material;
- a solid electrolyte; and
- a coating material coating the negative electrode active material, wherein
  the coating material is represented by the following composition formula (1):

$$Li_a A_b X_c \quad (1)$$

where a, b, and c are each a positive real number,
A is at least one selected from the group consisting of P and S, and
X is F and O.

The charge rate characteristics of a battery can be improved by using the negative electrode active material coated with the coating material represented by the formula (1).

In a second aspect of the present disclosure, for example, the negative electrode material according to the first aspect may be configured such that the coating material contains an $SO_xF_y$ group. Since this allows the formation of a more favorable coating layer, deterioration of the solid electrolyte can be suppressed, whereby the charge rate characteristics of a battery can be improved more effectively.

In a third aspect of the present disclosure, for example, the negative electrode material according to the second aspect may be configured such that the coating material contains Li, S, O, and F. This allows the formation of a more favorable interface between the active material and the solid electrolyte, whereby the charge rate characteristics of a battery can be improved more effectively.

In a fourth aspect of the present disclosure, for example, the negative electrode material according to the first aspect may be configured such that the coating material contains a $PO_xF_y$ group. This allows the formation of a more favorable interface between the active material and the solid electrolyte, whereby the charge rate characteristics of a battery can be improved more effectively.

In a fifth aspect of the present disclosure, for example, the negative electrode material according to the fourth aspect may be configured such that the coating material contains Li, S, O, and F. This allows the formation of a more favorable interface between the active material and the solid electrolyte, whereby the charge rate characteristics of a battery can be improved more effectively.

In a sixth aspect of the present disclosure, for example, the negative electrode material according to the first aspect may be configured such that the coating material includes at least one selected from the group consisting of $LiSO_3F$ and $LiPO_2F_2$. By using at least one selected from these materials as the coating material, the charge rate characteristics of a battery can be improved.

In a seventh aspect of the present disclosure, for example, the negative electrode material according to any one of the first to sixth aspects may be configured such that a layer of the coating material has a thickness of 0.5 nm or more and 20 nm or less. When the thickness of the layer of the coating material is adjusted to fall within such a range, the charge rate characteristics of a battery can be further improved while maintaining sufficient Li ion conductivity of the layer formed of the coating material.

In an eighth aspect of the present disclosure, for example, the negative electrode material according to any one of the first to seventh aspects may be configured such that the solid electrolyte includes at least one selected from the group consisting of sulfide solid electrolytes, halide solid electrolytes, and oxyhalide solid electrolytes. This can further improve the ionic conductance of the solid electrolyte.

In a ninth aspect of the present disclosure, for example, the negative electrode material according to any one of the first to eighth aspects may be configured such that the negative electrode active material includes at least one selected from the group consisting of a carbon material and an alloying active material that forms an alloy with lithium. By using an alloying active material, the energy density of the battery can be improved.

In a tenth aspect of the present disclosure, for example, the negative electrode material according to any one of the first to ninth aspects may be configured such that the negative electrode active material includes graphite. Graphite exhibits a small expansion rate during a lithium ion intercalation reaction, and thus is suitable as the negative electrode active material.

In an eleventh aspect of the present disclosure, for example, the negative electrode material according to any one of the first to tenth aspects may be configured such that the solid electrolyte has lithium ion conductivity. The negative electrode material configured as above can be used in a lithium-ion battery.

A battery according to a twelfth aspect of the present disclosure is a battery including:

a negative electrode including the negative electrode material according to any one of the first to eleventh aspects;

a positive electrode; and an electrolyte layer provided between the positive electrode and the negative electrode.

According to the battery of the present disclosure, the negative electrode can brings about the above-described benefits.

A negative electrode material production method according to a thirteenth aspect of the present disclosure is a method for producing a negative electrode material that includes a negative electrode active material and a coating material coating the negative electrode active material. The method includes:

producing a solution containing the coating material and a first solvent;

producing a mixture by mixing the solution with the negative electrode active material; and coating the negative electrode active material with the coating material by removing the first solvent from the mixture.

According to the method of the present disclosure, the negative electrode active material can be efficiently coated with the coating material. Since drying at high temperatures is not essential in the method of the present disclosure, the method can be carried out in a simple manner.

In a fourteenth aspect of the present disclosure, for example, the negative electrode material production method according to the thirteenth aspect may further include producing a negative electrode material in the form of a slurry by mixing and kneading a solid electrolyte and the negative electrode active material coated with the coating material using a second solvent in which the coating material is insoluble. This enables efficient production of a negative electrode.

Embodiments of the present disclose will be described below with reference to the drawings.

Embodiment 1

FIG. 1 is a cross-sectional view schematically showing the structure of a negative electrode material 3000 according to Embodiment 1.

The negative electrode material 3000 according to Embodiment 1 includes a coated active material 330 and a solid electrolyte 300. The coated active material 330 and the solid electrolyte 300 are in contact with each other.

The coated active material 330 includes a negative electrode active material 310 and a coating layer 320. The coating layer 320 is formed on the surface of the negative electrode active material 310. The coating layer 320 is a layer containing a coating material. The negative electrode active material 310 is coated with the coating material.

The coating material is in a solid state in the coating layer 320.

The coating material is represented by the following composition formula (1). In the formula (1), a, b, and c are each a positive real number. A is at least one selected from the group consisting of P and S. X is F and O.

$$Li_aA_bX_c \qquad (1)$$

Owing to the presence of the coating material represented by the formula (1) in the coating layer 320, the charge rate characteristics of a battery can be improved. Although the principle thereof is not necessarily clear, it is considered that this improvement is made by various factors in combination, such as the voltage endurance of the coating material, the oxidation resistance of the solid electrolyte 300, the reactivity between the coating material and the negative electrode active material 310, the reactivity between the coating material and the solid electrolyte 300, and the state of physical contact between the negative electrode active material 310 and the solid electrolyte 300. The coating material is considered to play a role in facilitating lithium ion transfer between the negative electrode active material 310 and the solid electrolyte 300 on the surface of the negative electrode active material 310. The coating layer 320 may contain only the coating material, apart from inevitable impurities.

This allows the formation of a more favorable interface between the coated active material 330 and the solid electrolyte 300, whereby the charge rate characteristics of a battery can be improved more effectively.

The coating material may contain an $SO_xF_y$ group. x and y are values that satisfy x>0 and y>0, respectively. Even if the stoichiometric composition of x and y is x+y=3 or 4, x and y are non-stoichiometric according to actual chemical analysis.

Since this allows the formation of a more favorable coating layer 320, deterioration of the solid electrolyte 300 can be suppressed, whereby the charge rate characteristics of a battery can be improved more effectively.

The coating material may contain Li, S, O, and F.

This allows the formation of a more favorable interface between the coated active material 330 and the solid electrolyte 300, whereby the charge rate characteristics of a battery can be improved more effectively. The coating material may consist of Li, S, O, and F, apart from inevitable impurities.

The coating material may contain a $PO_xF_y$ group. x and y are values that satisfy x>0 and y>0, respectively. Even if the stoichiometric composition of x and y is x+y=3 or 4, x and y are non-stoichiometric according to actual chemical analysis.

This allows the formation of a more favorable interface between the coated active material 330 and the solid electrolyte 300, whereby the charge rate characteristics of a battery can be improved more effectively.

The coating material may contain Li, P, O, and F.

This allows the formation of a more favorable interface between the coated active material 330 and the solid electrolyte 300, whereby the charge rate characteristics of a battery can be improved more effectively. The coating material may consist of Li, P, O, and F, apart from inevitable impurities.

The coating material may be a phosphoric acid-based material or a sulfonic acid-based material. The coating material may include at least one selected from the group consisting of $LiPOF_4$, $LiPO_2F_2$, $Li_2PO_3F$, and $LiSO_3F$.

Desirably, the coating material may include at least one selected from the group consisting of $LiSO_3F$ and $LiPO_2F_2$.

By using at least one selected from these materials as the coating material, the charge rate characteristics and life characteristics of a battery can be further improved.

The coating layer 320 may contain only the compound represented by the formula (1), apart from inevitable impurities. This allows the effect of improving the charge rate characteristics of a battery to be reliably obtained.

The ratio of the mass of the coating material to the mass of the coated active material 330 may be more than 0 mass % and 10.0 mass % or less. The ratio of the mass of the coating material to the mass of the coated active material 330 may be more than 0 mass % and 5.0 mass % or less. The ratio of the mass of the coating material to the mass of the coated active material 330 may be more than 0 mass % and 3.0 mass % or less.

When the coated amount is adjusted to fall within such a range, lithium ion transfer occurs smoothly between the coated active material 330 and the solid electrolyte 300, whereby the charge rate characteristics of a battery can be improved more effectively.

The ratio of the mass of the coating material to the mass of the coated active material 330 can be determined by the following method, for example. The coated active material 330 is dissolved in an acid or the like to prepare an aqueous solution. Thereafter, elements contained in the aqueous solution are quantified by inductively coupled plasma (ICP) emission spectrochemical analysis. Thus, the ratio of the mass of the coating material to the mass of the coated active material 330 can be determined. At this time, attention may be directed to the quantitative value of an element contained only in either one of the negative electrode active material 310 and the coating material. The elements may be quantified by dissolving the coating material in pure water and then detecting the dissolved ions through ion chromatography.

The coating material may have a peak in the range of 685±7 eV in the XPS spectrum measured using AlKα radiation. In the range of 685±7 eV, a peak derived from the F1s orbital is detected. In particular, a peak centered at 685 eV indicates the presence of a Li—F bond. The bond between Li and F is stronger than bonds between Li and other anions and thus is more stable. Accordingly, the coating material having a peak in the above-described range is less likely to change in quality during charge and discharge reactions, and thus can continuously improve the charge rate characteristics.

The coating layer 320 may have a thickness of 0.5 nm or more and 20 nm or less. By setting the thickness of the coating layer 320 to 0.5 nm or more, the charge rate characteristics of a battery can be further improved. By setting the thickness of the coating layer 320 to 20 nm or less, the Li ion conductivity is improved. More desirably, the coating layer 320 may have a thickness of 0.5 nm or more and 10 nm or less.

The method for measuring the thickness of the coating layer 320 is not limited to particular methods. For example, the thickness can be estimated by observing a specific peak derived from the coating material while removing the surface of the coated active material 330 through ion beam etching in XPS measurement. Alternatively, the thickness of the coating layer 320 may be measured through direct observation using a transmission electron microscope.

The surface of particles of the negative electrode active material 310 may be entirely coated with the coating layer 320. This can prevent direct contact between the particles of the negative electrode active material 310 and particles of the solid electrolyte 300, whereby the occurrence of side reactions of the solid electrolyte 300 can be suppressed. As a result, the charge and discharge efficiency can be improved.

Alternatively, the surface of particles of the negative electrode active material 310 may be only partially coated with the coating layer 320. A plurality of particles of the negative electrode active material 310 come into direct contact with each other via portions not coated with the coating layer 320, whereby the electronic conductivity between the particles of the negative electrode active material 310 is improved. This enables high power operation of a battery.

The shape of the solid electrolyte 300 in Embodiment 1 is not limited to particular shapes, and may be, for example, an acicular shape, a spherical shape, or an ellipsoidal shape. For example, the solid electrolyte 300 may be in the form of particles.

For example, when the solid electrolyte 300 is in the form of particles (e.g., spherical), the median diameter thereof may be 100 μm or less. When the median diameter of the solid electrolyte 300 is 100 μm or less, the coated active material 330 and the solid electrolyte 300 can form a favorable dispersion state in the negative electrode material 3000. This improves the charge rate characteristics of a battery. In Embodiment 1, the median diameter of the solid electrolyte 300 may be 10 μm or less.

This allows the coated active material 330 and the solid electrolyte 300 to form a more favorable dispersion state in the negative electrode material 3000.

In Embodiment 1, the median diameter of the solid electrolyte 300 may be smaller than the median diameter of the coated active material 330.

This allows the solid electrolyte 300 and the coated active material 330 to form a more favorable dispersion state in the negative electrode material 3000.

The coated active material 330 may have a median diameter of 0.1 μm or more and 100 μm or less.

When the median diameter of the coated active material 330 is 0.1 μm or more, the positive electrode active material 330 and the solid electrolyte 300 can form a favorable dispersion state in the negative electrode material 3000. This improves the charge and discharge characteristics of a battery.

When the median diameter of the coated active material 330 is 100 μm or less, a sufficiently high lithium diffusion rate is achieved in the coated active material 330. This enables high power operation of a battery.

The median diameter of the coated active material 330 may be larger than the median diameter of the solid electrolyte 300. This allows the coated active material 330 and the solid electrolyte 300 to form a favorable dispersion state.

In the negative electrode material 3000 of Embodiment 1, particles of the solid electrolyte 300 and particles of the coated active material 330 may be in contact with each other, as shown in FIG. 1. Spaces between the particles of the coated active material 330 may be filled with the solid electrolyte 300. In this case, the coating layer 320 and the solid electrolyte 300 are in contact with each other.

The negative electrode material 3000 of Embodiment 1 may include a plurality of particles of the solid electrolyte 300 and a plurality of particles of the coated active material 330.

The content of the solid electrolyte 300 and the content of the coated active material 330 in the negative electrode material 3000 may be the same or different from each other.

The term "median diameter" as used in the present specification means a particle diameter when the cumulative volume in the volumetric particle size distribution is equal to 50%. The volumetric particle size distribution is measured using a laser diffraction measurement device or an image analysis device, for example.

The solid electrolyte 300 may have lithium ion conductivity. In this case, the negative electrode material 3000 can be used in a lithium-ion battery.

The solid electrolyte 300 may include at least one selected from the group consisting of a sulfide solid electrolyte, a halide solid electrolyte, and an oxyhalide solid electrolyte.

This can improve the ionic conductance of the solid electrolyte 300. As a result, the resistance of a battery can be reduced.

Examples of the halide solid electrolytes include $Li_3YX'_6$, $Li_2MgX'_4$, $Li_2FeX'_4$, $Li(Al, Ga, In)X'_4$, and $Li_3(Al, Ga, In)X'_6$.

Examples of the oxyhalide solid electrolytes include $Li_a(Ta, Nb)_bO_cX'_d$. a, b, c, and d are each independently a value greater than 0. X' includes at least one selected from the group consisting of F, Cl, Br, and I.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. $LiX'$, $Li_2O$, $MO_q$, $LiMO_q$, or the like further may be added thereto. The element X' in "LiX'" is at least one element selected from the group consisting of F, Cl, Br, and I. The element M in "$MO_q$" and "$Li_pMO_q$" is at least one element selected from the group consisting of P, Si, Ge, B, Al, Ga, In, Fe, and Zn. p and q in "$MO_q$" and "$Li_pMO_q$" are each independently a natural number.

In the present disclosure, when an element in a formula is expressed as, e.g., "(Al, Ga, In)", it indicates at least one element selected from the group of elements in parentheses. That is, "(Al, Ga, In)" means the same as "at least one selected from the group consisting of Al, Ga, and In". The same applies to other elements.

The solid electrolytes of various types can be produced in the following manner, for example.

Raw material powders are prepared at a blending ratio to achieve an intended composition. For example, in order to produce $Li_3YBr_3Cb$, $LiCl$ and $YBr_3$ are prepared at a molar ratio of 3:1. The composition of a solid electrolyte can be adjusted by adjusting the types of raw material powders, the blending ratio of the raw material powders, and the synthesizing process.

The raw material powders are well mixed together, and thereafter, the raw material powders are mixed, milled, and reacted with each other using a mechanochemical milling process. Alternatively, after well mixing the raw material powders, the resulting mixture may be fired in an inert atmosphere. As a result, a desired solid electrolyte is obtained.

The negative electrode active material 310 may be a material having properties of occluding and releasing metal ions such as lithium ions.

The negative electrode active material 310 may be at least one selected from the group consisting of a carbon material, a metal material, an oxide, a nitride, a tin compound, silicon, a silicon compound, and a titanium compound. Either an elemental metal or an alloy may be used as a metal material. Examples of the metal materials include lithium metals, lithium alloys, tin, and tin alloys. Examples of the carbon materials include graphite, coke, carbon undergoing graphitization, carbon fibers, spherical carbon, and amorphous carbon.

The negative electrode active material 310 may include at least one selected from the group consisting of a carbon material and an alloying active material that forms an alloy with lithium. Carbon materials exhibit a relatively small expansion rate during charging. Thus, using a carbon material as the negative electrode active material 310 can enhance the safety of a battery. The carbon material typically includes graphite. Graphite exhibits a small expansion rate during a lithium ion intercalation reaction, and thus is suitable as the negative electrode active material 310. Alloying active materials have a large theoretical capacity. By using an alloying active material, the energy density of a battery can be improved. Examples of the alloying active material include silicon, tin, silicon compounds, and tin compounds.

The negative electrode active material 310 may be in the form of particles, for example. The shape of the particles of the negative electrode active material 310 is not limited to particular shapes. The shape of the particles of the negative electrode active material 310 may be a spherical shape, an ellipsoidal shape, a scale-like shape, or a fibrous shape.

Next, the method for producing the negative electrode material 3000 will be described.

First, a solution containing a coating material and a first solvent is produced. The first solvent is a solvent capable of dissolving the coating material represented by the formula (1). Examples of the first solvent include dimethyl carbonate, ethyl methyl carbonate, diethyl carbonate, ethanol, methanol, hexanal, N-methylpyrrolidone, acetophenone, tetrahydrofurfuryl alcohol, methyl benzoate, methyl salicylate, isophorone, ethyl cyanoacetate, diethyl malonate, 1,4-dichlorobutane, ethyl acetate, benzaldehyde, chloracetone, pyridine, butyronitrile, and acrylonitrile. One selected from these solvents may be used alone as the first solvent, or a mixed solvent containing two or more of them may be used as the first solvent.

Next, the solution and the negative electrode active material 310 are mixed together to produce a mixture. The first solvent is removed from the thus-obtained mixture, whereby the negative electrode active material 310 is coated with the coating material. The first solvent may be removed from the mixture by allowing the mixture to stand still in an atmosphere at room temperature. Alternatively, the mixture may be heated to volatilize the first solvent from the mixture. As a result, powder of the coated active material 330 is obtained. According to such a method, the negative electrode active material 310 can be efficiently coated with the coating material. Considering the fact that the first solvent may be removed by heating, it is recommendable to use, as the first solvent, a solvent having a boiling point lower than the degradation temperature of the coating material.

Further, the solid electrolyte 300 and the negative electrode active material 310 coated with the coating material are mixed and kneaded using a second solvent in which the coating material is insoluble to produce the negative electrode material 3000 in the form of a slurry. The negative electrode material 3000 in the form of a slurry is applied to a negative electrode current collector to form a coating thereon, and the coating is then dried. Thus, a negative electrode of a battery is obtained. The coating may be dried by heating the coating at a temperature higher than room temperature. Alternatively, the coating may dried by allowing the coating to stand still in an atmosphere at room temperature. Even in the former case, a drying temperature lower than 300° C. sufficiently works. According to the method of the present embodiment, a negative electrode can be efficiently produced by a wet method such as a coating method. Since drying at high temperatures is not essential in the method of the present embodiment, the method can be carried out in a simple manner.

The second solvent has a lower δp value than the first solvent. The coating material and the solid electrolyte are insoluble in the second solvent. By using the second solvent, the negative electrode containing the coated active material 330 and the solid electrolyte 300 can be produced while maintaining the coating layer 320. The "δp value" is the polarization term in the Hansen solubility parameter.

Embodiment 2

Embodiment 2 will be described below. Of the descriptions made in Embodiment 1 above, those applicable to Embodiment 2 will not be repeated here, where appropriate.

Figure 2:
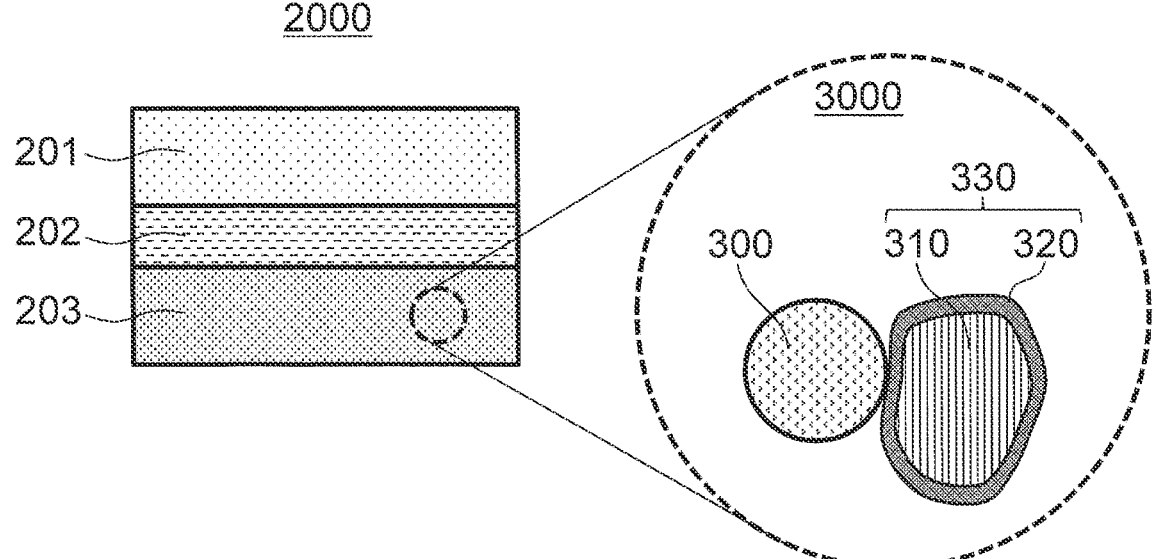
FIG. 2 is a cross-sectional view schematically showing the structure of a battery 2000 according to Embodiment 2.

FIG. 2 is a cross-sectional view schematically showing the structure of a battery 2000 according to Embodiment 2.

The battery 2000 according to Embodiment 2 includes a positive electrode 201, an electrolyte layer 202, and a negative electrode 203.

The negative electrode 203 includes the negative electrode material 3000 according to Embodiment 1. The negative electrode 203 brings about the benefits described in Embodiment 1.

The electrolyte layer 202 is disposed between the positive electrode 201 and the negative electrode 203.

The battery 2000 configured as above can achieve improved charge and discharge efficiency.

When the volume ratio between the negative electrode active material 310 and the solid electrolyte 300 (first solid electrolyte) in the negative electrode 203 is expressed as "v2: 100−v2", the volume ratio v2 of the negative electrode active material 310 may satisfy 30≤v2≤95. When 30≤v2 is satisfied, the battery 2000 can have a sufficient energy density. When v2≤95 is satisfied, high power operation becomes possible.

The negative electrode 203 may have a thickness of 10 μm or more and 500 μm or less. When the thickness of the negative electrode 203 is 10 μm or more, the battery 2000 can have a sufficient energy density. When the thickness of the negative electrode 203 is 500 μm or less, high power operation becomes possible.

The positive electrode 201 includes a positive electrode active material and a solid electrolyte (third solid electrolyte). The positive electrode active material may be a material having properties of occluding and releasing metal ions such as lithium ions. Examples of the positive electrode active material include lithium-containing transition metal oxides, transition metal fluorides, polyanion materials, fluorinated polyanion materials, transition metal sulfides, transition metal oxysulfides, and transition metal oxynitrides. In particular, when a lithium-containing transition metal oxide is used as the positive electrode active material, the battery can be produced at a low production cost and can have a high average discharge voltage.

The positive electrode active material may be a material containing Li and at least one element selected from the group consisting of Mn, Co, Ni, and A. Examples of such a material include $Li(NiCoAl)O_2$, $Li(NiCoMn)O_2$, and $LiCoO_2$.

The positive electrode active material may be in the form of particles, for example. The shape of the particles of the positive electrode active material is not limited to particular shapes. The particles of the positive electrode active material may have an acicular shape, a spherical shape, an ellipsoidal shape, or a scale-like shape.

The particles of the positive electrode active material may have a median diameter of 0.1 μm or more and 100 μm or less. When the median diameter of the particles of the positive electrode active material is 0.1 μm or more, the positive electrode active material and the solid electrolyte can form a favorable dispersion state in the positive electrode 201. As a result, the charge and discharge characteristics of the battery 2000 are improved. When the median diameter of the particles of the positive electrode active material is 100 μm or less, the lithium diffusion in the particles of the positive electrode active material becomes faster. This enables high power operation of the battery 2000.

The solid electrolyte of the positive electrode 201 may be at least one selected from the group consisting of a sulfide solid electrolyte, an oxide solid electrolyte, a halide solid electrolyte, a polymer solid electrolyte, and a complex hydride solid electrolyte. Oxide solid electrolytes have excellent high-potential stability. By using an oxide solid electrolyte, the charge and discharge efficiency of the battery 2000 can be further improved.

When the volume ratio between the positive electrode active material and the solid electrolyte in the negative electrode 201 is expressed as "v1: 100−v1", the volume ratio v1 of the positive electrode active material may satisfy 30≤v1≤95. When 30≤v1 is satisfied, the battery 2000 can have a sufficient energy density. When v1≤95 is satisfied, high power operation becomes possible.

The positive electrode 201 may have a thickness of 10 μm or more and 500 μm or less. When the thickness of the positive electrode 201 is 10 μm or more, the battery 2000 can have a sufficient energy density. When the thickness of the positive electrode 201 is 500 μm or less, high power operation becomes possible.

When the solid electrolyte included in the positive electrode 201 is in the form of particles (e.g., spherical), the median diameter of the group of particles of the solid electrolyte may be 100 μm or less. When the median diameter is 100 μm or less, the positive electrode active material and the solid electrolyte can form a favorable dispersion state in the positive electrode 201. This improves the charge and discharge characteristics of the battery 2000.

The electrolyte layer 202 is a layer containing an electrolyte. The electrolyte is a solid electrolyte, for example. In other words, the electrolyte layer 202 may be a solid electrolyte layer. Hereinafter, the solid electrolyte contained in the electrolyte layer 202 is also referred to as a "second solid electrolyte".

As the second solid electrolyte, materials given above as examples of the solid electrolyte in Embodiment 1 may be used. That is to say, the electrolyte layer 202 may contain a solid electrolyte having the same composition as the solid electrolyte 300 contained in the negative electrode material 3000.

This can further improve the charge and discharge efficiency of the battery 2000.

Alternatively, the electrolyte layer 202 may contain a halide solid electrolyte having a composition that differs from that of the solid electrolyte 300 contained in the negative electrode material 3000.

This can improve the power density and the charge and discharge efficiency of the battery 2000.

The halide solid electrolyte contained in the electrolyte layer 202 may contain Y as a metal element.

This can further improve the power density and the charge and discharge efficiency of the battery 2000.

The electrolyte layer 202 may contain a sulfide solid electrolyte. Examples of the sulfide solid electrolyte include those given as examples thereof in Embodiment 1.

The battery 2000 configured as above includes a sulfide solid electrolyte with excellent reduction stability and thus can use a low-potential negative electrode material such as graphite or metallic lithium. Accordingly, the energy density of the battery 2000 can be improved.

The electrolyte layer 202 may contain at least one selected from the group consisting of an oxide solid electrolyte, a polymer solid electrolyte, and a complex hydride solid electrolyte.

Examples of the oxide solid electrolytes include: NASICON solid electrolytes typified by $LiTi_2(PO_4)_3$ and element-substituted products thereof; $(LaLi)TiO_3$-based perovskite solid electrolytes; LISICON solid electrolytes typified by $Li_{14}ZnGe_4O_{16}$, $Li_4SiO_4$, and $LiGeO_4$ and element-substituted products thereof; garnet solid electrolytes typified by $Li_7La_3Zr_2O_{12}$ and element-substituted products thereof; $Li_3N$ and H-substituted products thereof; $Li_3PO_4$ and N-substituted products thereof; and glass and glass ceramics obtained by adding a material such as $Li_2SO_4$ or $Li_2CO_3$ to a base material containing a Li—B—O compound such as $LiBO_2$ or $Li_3BO_3$.

Examples of the polymer solid electrolytes include compounds composed of a polymer compound and a lithium salt. The polymer compound may have an ethylene oxide structure. Since the polymer compound with the ethylene oxide structure can contain a large amount of lithium salt, this can further improve the ionic conductance. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, one lithium salt selected from them may be used alone, or a mixture of two or more lithium salts selected from them may be used.

Examples of the complex hydride solid electrolytes include $LiBH_4$—LiI and $LiBH_4$—$P_2S_5$.

The electrolyte layer 202 may contain the second solid electrolyte as a main component. In other words, the electrolyte layer 202 may contain 50% or more of the second solid electrolyte by mass (i.e., 50 mass % or more of the second solid electrolyte) with respect to the total mass of the electrolyte layer 202.

This can further improve the charge and discharge characteristics of the battery 2000.

The electrolyte layer 202 may contain 70% or more of the second solid electrolyte by mass (i.e., 70 mass % or more of the second solid electrolyte) with respect to the total mass of the electrolyte layer 202.

This can further improve the charge and discharge characteristics of the battery 2000.

In addition to the second solid electrolyte as the main component, the electrolyte layer 202 may further contain inevitable impurities, or starting materials used for synthesis of the second solid electrolyte, by-products, degradation products, and the like.

The electrolyte layer 202 may contain 100% of the second solid electrolyte by mass (i.e., 100 mass % of the second solid electrolyte) with respect to the total mass of the electrolyte layer 202, apart from inevitable impurities.

This can further improve the charge and discharge characteristics of the battery 2000.

As described above, the electrolyte layer 202 may consist of the second solid electrolyte.

The electrolyte layer 202 may contain only one solid electrolyte selected from the group of solid electrolytes described above, or may contain two or more solid electrolytes selected from the group of solid electrolytes described above. The plurality of solid electrolytes have compositions that differ from each other. For example, the electrolyte layer 202 may contain a halide solid electrolyte and a sulfide solid electrolyte.

The electrolyte layer 202 may have a thickness of 1 μm or more and 300 μm or less. When the thickness of the electrolyte layer 202 is 1 µm or more, the positive electrode 201 and the negative electrode 203 can be more reliably separated from each other. When the thickness of the first electrolyte layer 202 is 300 µm or less, high power operation can be achieved.

At least one of the positive electrode 201, the electrolyte layer 202, and the negative electrode 203 may contain a binder to improve the adhesion between particles. The binder is used to improve the binding properties of the materials constituting the electrodes. Examples of the binder include polyvinylidene fluoride, polytetrafluoroethylene, polyethylene, polypropylene, aramid resin, polyamide, polyimide, polyamide-imide, polyacrylonitrile, polyacrylic acid, poly(acrylic acid methyl ester), poly(acrylic acid ethyl ester), poly(acrylic acid hexyl ester), polymethacrylic acid, poly(methacrylic acid methyl ester), poly(methacrylic acid ethyl ester), poly(methacrylic acid hexyl ester), polyvinyl acetate, polyvinylpyrrolidone, polyether, polyether sulfone, hexafluoropolypropylene, styrene-butadiene rubber, and carboxymethyl cellulose. Also, the binder may be a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The binder may be a mixture of two or more materials selected from them.

At least one of the positive electrode 201 and the negative electrode 203 may contain a conductive additive to improve the electronic conductivity. Examples of the conductive additive include: graphite such as natural graphite and artificial graphite; carbon blacks such as acetylene black and Ketjen black; conductive fibers such as carbon fibers and metal fibers; carbon fluoride; metal powders such as aluminum powder; conductive whiskers such as zinc oxide whiskers and potassium titanate whiskers; conductive metal oxides such as titanium oxide; and conductive polymer compounds such as polyaniline, polypyrrole, and polythiophene. Cost reduction can be achieved by using a carbon conductive additive.

The positive electrode 201 and the negative electrode 203 may each have a current collector. Examples of the material of the current collector include aluminum, aluminum alloys, stainless steel, copper, and nickel.

The battery 2000 of Embodiment 2 can be embodied as batteries with various shapes, including a coin battery, a cylindrical battery, a prismatic battery, a sheet-like battery, a button battery, a flat-type battery, and a stacked battery.

EXAMPLES

The present disclosure will be described in detail below with reference to examples and comparative examples.
[Production of Sulfide Solid Electrolyte]
In an Ar atmosphere glove box with a dew point of −60° C. or less, $Li_2S$ and $P_2S_5$ were weighed such that they were at a molar ratio of $Li_2S:P_2S_5$=75:25. They were pulverized and mixed together in a mortar to obtain a mixture. Thereafter, the mixture was subjected to a milling process at 510 rpm for 10 hours using a planetary ball mill (Type P-7, manufactured by Fritsch GmbH). As a result, a glassy solid electrolyte was obtained. The glassy solid electrolyte was heat-treated in an inert atmosphere at 270° C. for 2 hours. As a result, powder of a glass-ceramic-like sulfide solid electrolyte $Li_2S$—$P_2S_5$ was obtained.

Example 1

[Production of Coated Active Material]
In an Ar atmosphere glove box with a dew point of −60° C. or less, 0.12 g of $LiSO_3F$ was dissolved in 9.88 g of dimethyl carbonate. Thus, a 1.2 mass % lithium sulfonate solution was obtained.

10 g of the $LiSO_3F$ solution was mixed with 10 g of graphite. The resulting mixture was allowed to stand at room temperature for 24 hours, and then dried at 105° C. for 8 hours. Thus, graphite coated with $LiSO_3F$ was obtained as a coated active material.
[Production of Negative Electrode Material]
In an Ar atmosphere glove box with a dew point of −60° C. or less, the coated active material and the sulfide solid electrolyte were mixed together at a mass ratio of 7:3. Thus, a negative electrode material of Example 1 was obtained.
[Production of Battery]
The following steps were performed using the negative electrode material, the sulfide solid electrolyte, and a copper foil (thickness: 12 µm).

First, 10 mg of the sulfide solid electrolyte and 10 mg of the negative electrode material were stacked together in an insulating outer cylinder. They were pressure-molded at a pressure of 360 MPa, whereby a stack composed of a negative electrode active material layer and an electrolyte layer was obtained.

Subsequently, the copper foil was stacked on the negative electrode active material layer. They were pressure-molded at a pressure of 360 MPa, whereby a stack composed of a negative electrode current collector, the negative electrode active material layer, and the electrolyte layer was obtained.

Next, metallic In (thickness: 200 µm), metallic Li (thickness: 300 µm), and metallic In (thickness: 200 µm) were stacked on the electrolyte layer in this order. They were pressure-molded at a pressure of 80 MPa, whereby a stack composed of a positive electrode, the electrolyte layer, and a negative electrode was obtained.

Next, current collectors made of stainless steel were placed on the top and the bottom of the stack, and current collector leads were attached to the current collectors.

Finally, the insulating outer cylinder was sealed with an insulating ferrule to shield the interior of the insulating outer cylinder from the outside atmosphere. Thus, a battery of Example 1 was produced.

Example 2

[Production of Coated Active Material]
10 g of the $LiSO_3F$ solution, 9 g of graphite, and 1 g of silicon were mixed together. The resulting mixture was allowed to stand at room temperature for 24 hours, and then dried at 105° C. for 8 hours. Thus, as a coated active material, a mixed active material composed of graphite coated with $LiSO_3F$ and silicon coated with $LiSO_3F$ was obtained. The graphite and Si were both in the form of powder.
[Production of Negative Electrode Material]
In an Ar atmosphere glove box with a dew point of −60° C. or less, the mixed active material and the sulfide solid electrolyte were mixed together at a mass ratio of 7:3. Thus, a negative electrode material of Example 2 was obtained.
[Production of Battery]
A battery of Example 2 was produced in the same manner as in Example 1, except that 5 mg of the negative electrode material of Example 2 was used instead of the negative electrode material of Example 1.

Example 3

[Production of Coated Active Material]

In an Ar atmosphere glove box with a dew point of −60° C. or less, 0.6 g of $LiPO_2F_2$ was dissolved in 9.94 g of dimethyl carbonate. Thus, a 0.6 mass % $LiPO_2F_2$ solution was obtained.

[Production of Negative Electrode Material]

10 g of the $LiPO_2F_2$ solution was mixed with 10 g of graphite. The resulting mixture was allowed to stand at room temperature for 24 hours, and then dried at 105° C. for 8 hours. Thus, as a coated active material, graphite coated with $LiPO_2F_2$ was obtained.

[Production of Battery]

A battery of Example 3 was produced in the same manner as in Example 1, except that the negative electrode material of Example 3 was used instead of the negative electrode material of Example 1.

Comparative Example 1

A battery of Comparative Example 1 was produced in the same manner as in Example 1, except that graphite without a coating layer was used as a negative electrode active material.

Comparative Example 2

A battery of Comparative Example 2 was produced in the same manner as in Example 2, except that a mixture of graphite without a coating layer and silicon without a coating layer was used as a negative electrode active material.

Comparative Example 3

A battery of Comparative Example 3 was produced in the same manner as in Example 1, except that 7.7 mg of graphite without a coating layer was used as a negative electrode active material.

Comparative Example 4

[Production of Coated Active Material]

In an Ar atmosphere glove box with a dew point of −60° C. or less, a coated active material was obtained by coating graphite with amorphous carbon according to the method disclosed in Japanese Patent No. 4729716.

[Production of Negative Electrode Material]

In an Ar atmosphere glove box with a dew point of −60° C. or less, the coated active material and the sulfide solid electrolyte were mixed together at a mass ratio of 7:3. Thus, a negative electrode material of Comparative Example 4 was obtained.

[Production of Battery]

A battery of Comparative Example 4 was produced in the same manner as in Example 1, except that 10 mg of the negative electrode material of Comparative Example 4 was used instead of the negative electrode material of Example 1.

Comparative Example 5

A battery of Comparative Example 5 was produced in the same manner as in Example 1, except that LiFSI(LiN($SO_2F)_2$) was used as a coating material.

Comparative Example 6

[Production of Coated Active Material]

In an Ar atmosphere glove box with a dew point of −60° C. or less, 0.6 g of $LiPF_6$ was dissolved in 9.94 g of dimethyl carbonate. Thus, a 0.6 mass % $LiPF_6$ solution was obtained.

[Production of Negative Electrode Material]

10 g of the $LiPF_6$ solution was mixed with 10 g of graphite. The resulting mixture was allowed to stand at room temperature for 24 hours, and then dried at 105° C. for 8 hours. Thus, as a coated active material, graphite coated with $LiPF_6$ was obtained.

[Production of Battery]

A battery of Comparative Example 6 was produced in the same manner as in Example 1, except that the negative electrode material of Comparative Example 6 was used instead of the negative electrode material of Example 1.

[Charge and Discharge Test]

Each of the batteries of Examples 1 to 3 and Comparative Examples 1 to 6 was subjected to a charge and discharge test conducted under the following conditions.

The battery was placed in a thermostatic chamber at 25° C.

The battery was charged with a constant current of 380 µA corresponding to 0.05 C rate (20-hour rate) with respect to the theoretical capacity of the battery, and the charging was terminated when the voltage reached −0.62 V.

Next, the battery was discharged with a constant current of 380 µA corresponding to 0.05 C rate (20-hour rate), and the discharging was terminated when the voltage reached 1.9 V. In the case of the battery of Comparative Example 3, the current value was 292 µA.

Further, the battery was charged with a constant current of 380 µA corresponding to 0.05 C rate (20-hour rate) with respect to the theoretical capacity of the battery, and the charging was terminated when the voltage reached −0.62 V. In the case of the battery of Comparative Example 3, the current value was 292 µA. The charge capacity at this time was recorded as "0.05 C charge capacity".

Still further, each of the batteries of the examples and comparative examples was discharged with a constant current at 0.05 C rate (20-hour rate), then charged with a constant current of 3800 µA, which was 10 times greater than the constant current previously used, and the charging was terminated when the voltage reached −0.62 V. In the case of the battery of Comparative Example 3, the current value was 2920 µA. The charge capacity at this time was recorded as "0.5 C charge capacity".

For each of the batteries of the examples and comparative examples, the percentage of the 0.5 C charge capacity relative to the 0.05 C charge capacity was calculated. Also, the percentage of the 0.05 C charge capacity of each of the batteries relative to the 0.05 C charge capacity of the battery of Example 1 was calculated. The results obtained are shown in Table 1.

TABLE 1

| | 0.5 C charge capacity/ 0.05 C charge capacity (%) | 0.05 C charge capacity/ 0.05 C charge capacity in Example 1 (%) |
|---|---|---|
| Example 1 | 65 | 100 |
| Example 2 | 70 | 100 |
| Example 3 | 67 | 100 |
| Comparative Example 1 | 43 | 100 |
| Comparative Example 2 | 46 | 100 |
| Comparative Example 3 | 65 | 77 |
| Comparative Example 4 | 22 | 100 |
| Comparative Example 5 | 44 | 100 |
| Comparative Example 6 | 51 | 100 |

DISCUSSION

The percentage calculated from (0.5 C charge capacity)/(0.05 C charge capacity) reflects the charge rate characteristics. That is, the higher the value of (0.5 C charge capacity)/(0.05 C charge capacity), the shorter the time required for charging.

As shown in Table 1, the value of (0.5 C charge capacity)/(0.05 C charge capacity) of the battery of Example 1 was higher than that of the battery of Comparative Example 1. This demonstrate that the charge rate characteristics were improved by coating the negative electrode active material with LiSO$_3$F.

In general, coating the surface of an active material with an inorganic compound that does not have lithium ion conductivity hinders the transfer of lithium ions and thus causes resistance. On this account, it is rare to select such an inorganic compound as a coating material used for improving the charge rate characteristics.

Surprisingly, however, the charge rate characteristics of the battery of Example 1 were improved by using LiSO$_3$F as the coating material. The lithium ion concentration in the coating layer is considered to be involved in this improvement. In the batteries of the examples, the lithium concentration in the coating layer was high. It is considered that this allowed smooth incorporation of lithium ions into the negative electrode active material during the charging, whereby the charge rate characteristics were improved.

As can be seen from the comparison between Example 2 and Comparison Example 2, the same effect was obtained when the alloying active material was used as the negative electrode active material.

Moreover, as can be seen from the result obtained in Example 3, a significant effect was obtained when LiPO$_2$F$_2$ was used as the coating material.

On the other hand, in Comparative Examples 1 and 2, the source of Li was limited to Li contained in the solid electrolyte. This is considered to be the reason why the charge rate characteristics of the batteries of Comparative Examples 1 and 2 were inferior to those of the batteries of the examples.

The charge rate characteristics of the battery of Comparative Example 3 were equivalent to those of the battery of Example 1. However, since the amount of the negative electrode active material was reduced in Comparative Example 3, the charge capacity of the battery of Comparative Example 3 was much lower than that of the battery of Example 1. Comparative Example 3 demonstrates that the charge rate characteristics can be improved at the expense of the energy density of a battery. However, Comparative Example 3 is undesirable from the viewpoint of the energy density of a battery.

The charge rate characteristics of the battery of Comparative Example 4 were much lower than those of the other batteries. The coating layer formed of the amorphous carbon was not merely ineffective in improving the charge rate characteristics of the solid-state battery but it rather deteriorated the charge rate characteristics.

In the battery of Comparative Example 5, the graphite was coated with lithium salt (LiFSI) with nitrogen (N) contained in anions. As can be seen from the comparison of the results obtained in Comparative Examples 1 and 5, the charge rate characteristics were not improved by coating the graphite with LiFSI. This indicates that not all lithium salts can bring about the same effect.

In the battery of Comparative Example 6, the graphite was coated with LiPF$_6$. As can be seen from the comparison of the results obtained in Example 1 and Comparative Examples 1 and 6, the coating layer formed of LiPF$_6$ improved the charge rate characteristics but the effect thereof was limited.

INDUSTRIAL APPLICABILITY

The battery of the present disclosure can be utilized as, for example, an all-solid-state lithium secondary battery.

What is claimed is:

1. A negative electrode material comprising:
   a negative electrode active material;
   a solid electrolyte; and
   a coating material coating the negative electrode active material, wherein
   the coating material is represented by the following composition formula (1):

$$Li_a A_b X_c \quad (1)$$

where a, b, and c are each a positive real number,
   A is at least one selected from the group consisting of P and S,
   X is F and O, and
   the coating material comprises an SO$_x$F$_y$ group.

2. The negative electrode material according to claim 1, wherein the coating material comprises Li, S, O, and F.

3. The negative electrode material according to claim 1, wherein
   the coating material comprises a PO$_x$F$_y$ group.

4. The negative electrode material according to claim 3, wherein
   the coating material comprises Li, P, O, and F.

5. The negative electrode material according to claim 1, wherein
   the coating material comprises at least one selected from the group consisting of LiSO$_3$F and LiPO$_2$F$_2$.

6. The negative electrode material according to claim 1, wherein
   a layer of the coating material has a thickness of 0.5 nm or more and 20 nm or less.

7. The negative electrode material according to claim 1, wherein
   the solid electrolyte comprises at least one selected from the group consisting of a sulfide solid electrolyte, a halide solid electrolyte, and an oxyhalide solid electrolyte.

8. The negative electrode material according to claim 1, wherein
the negative electrode active material comprises at least one selected from the group consisting of a carbon material and an alloying active material that forms an alloy with lithium.

9. The negative electrode material according to claim 1, wherein
the negative electrode active material comprises graphite.

10. The negative electrode material according to claim 1, wherein
the solid electrolyte has lithium ion conductivity.

11. A battery comprising:
a negative electrode comprising the negative electrode material according to claim 1;
a positive electrode; and
an electrolyte layer provided between the positive electrode and the negative electrode.

12. A method for producing a negative electrode material that comprises a negative electrode active material and a coating material coating the negative electrode active material, the method comprising:
producing a solution comprising the coating material and a first solvent;
producing a mixture by mixing the solution with the negative electrode active material;
coating the negative electrode active material with the coating material by removing the first solvent from the mixture, and
producing a negative electrode material in the form of a slurry by mixing and kneading a solid electrolyte and the negative electrode active material coated with the coating material using a second solvent in which the coating material is insoluble.

* * * * *